United States Patent [19]
Liao

[11] Patent Number: 5,657,051
[45] Date of Patent: Aug. 12, 1997

[54] MULTIDIMENSIONAL MOUSE FOR USE WITH COMPUTERS

[75] Inventor: Jui-tsung Liao, Sanchung, Taiwan

[73] Assignee: Kye Systems Corp., Sanchung, Taiwan

[21] Appl. No.: 661,669

[22] Filed: Jun. 11, 1996

[51] Int. Cl.$^6$ ..................................... G06F 3/033
[52] U.S. Cl. ..................... 345/163; 200/339; 200/341
[58] Field of Search .................... 345/156, 157, 345/158, 161, 163, 167, 145; 395/821; 273/148 R, 148 B; 200/341, 339; 463/37

[56] References Cited

U.S. PATENT DOCUMENTS

| | | | |
|---|---|---|---|
| 5,396,030 | 3/1995 | Matsumiya et al. | 200/6 A |
| 5,446,481 | 8/1995 | Gillick et al. | 345/163 |

Primary Examiner—Kee M. Tung
Assistant Examiner—Chris Albert
Attorney, Agent, or Firm—Hedman, Gibson & Costigan, P.C.

[57] ABSTRACT

A multidimensional mouse of computers includes a Z-axis key pivotally connected to the mouse by a pivot and defines two ends spaced from each other by the pivot. Two elastic loads respectively installed inside the mouse and a corresponding one of the two elastic loads is deformed in response to a manual depression on one of the two ends of the Z-axis key, thus allowing an electrical contact to occur inside the mouse, and this electrical contact is retained if the manual depression is retained. The deformed elastic load has a tension to recover the Z-axis key back to a non-depressed position after the manual depression on the Z-axis key is released. A displacement of a cursor along a Z-axis on a computer screen is based on a time period during which the end of the Z-axis key is kept depressed.

9 Claims, 5 Drawing Sheets

MULTIDIMENSIONAL MOUSE FOR USE WITH COMPUTERS

BACKGROUND OF THE INVENTION

1. Field of the Invention

The present invention relates to a multidimensional mouse for use with computers, and more particularly to one which meets ergonomic requirements to allow a user to operate the mouse to control its Z-direction movement by merely depressing a specific key at its front/rear half portion and simultaneously moving the mouse thus simplifying the entry about the Z-directional data to the related computer.

2. Description of the Prior Art

A conventional computer mouse is installed with a ball at the bottom thereof for cooperating with an optical encoder thus receiving an X-axis or Y-axis movement signal as an entry (input). The received movement signal is encoded as a provisioning (temporary) data which is further decoded to control a cursor to move on the computer screen. During this decade (1990 to 1999), three dimensional drawings have become very popular in the computer aided drafting field, therefore the most advanced mouse 10 as shown in FIG. 7 is installed with a roller 50 for receiving the Z-axis relating entry thus controlling the cursor movement in the Z-axis direction of the computer screen. The detailed drawing of the mouse 10 is illustrated in FIG. 8, where an axis angle encoder 51 is installed at one end of the longitudinal length of the roller 50 for receiving and encoding the Z-axis entry to the mouse 10. The axis angle encoder 51 includes a transmitter 53, an optical detector 54, and a semi-circular optical grid 52 located between the transmitter 53 and the optical detector 54. The optical grid 52 defines several holes 55 therein and it is connected to and driven by the roller 50, therefore when the roller 50 rotates, the related entry to the mouse 10 will be encoded by the axis angle encoder 51, thus the cursor on the computer screen will move along the Z-axis with a corresponding amount based on the encoded result (data). However, to use this roller 50 for controlling the Z-axis movement does not meet the ergonomic requirements involved. For example, when the mouse 10 is manually moved forward (see the direction as shown by the arrow of FIG. 7) to make the cursor on the computer screen move in a corresponding direction on the X-Y plane, if the roller 50 is also moved to rotate forward (see the arrow in the top-right corner of FIG. 8), the cursor will move a corresponding distance in the positive Z-axis direction. However, if the user wants to move the cursor along the negative Z-axis direction while still retaining the same direction on the X-Y plane, he has to move the mouse 10 forward but rotate the roller 50 backward. This does not meet the ergonomic requirements, therefore, the user has to separate the operation into two steps: firstly, to move the mouse 10 forward, and secondly, to stop moving the mouse 10 and to rotate the roller 50 backward.

It is requisite to provide a new mouse which allows a user to move the cursor on the computer screen along any three-dimensional direction simultaneously.

SUMMARY OF THE INVENTION

The primary objective of the present invention is to provide a new multidimensional mouse for use with computers, which allows a user to control a cursor on a computer screen to move in any desired three dimensional direction simultaneously.

In accordance with one aspect of the invention, there is provided a multidimensional mouse for use with computers, including a Z-axis key pivotally connected to the mouse by a pivot and defining two ends spaced from each other by the pivot. Two elastic loads are respectively installed inside the mouse and a corresponding one of the two elastic loads is deformed in response to a manual depression on one of the two ends of the Z-axis key, thus allowing an electrical contact to occur inside the mouse, and this electrical contact is retained if the manual depression is retained. The deformed elastic load has a tension to recover the Z-axis key back to a non-depressed position after the manual depression on the Z-axis key is released. A displacement of a cursor along a Z-axis on a computer screen is based on a time period during which the end of the Z-axis key is kept depressed.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
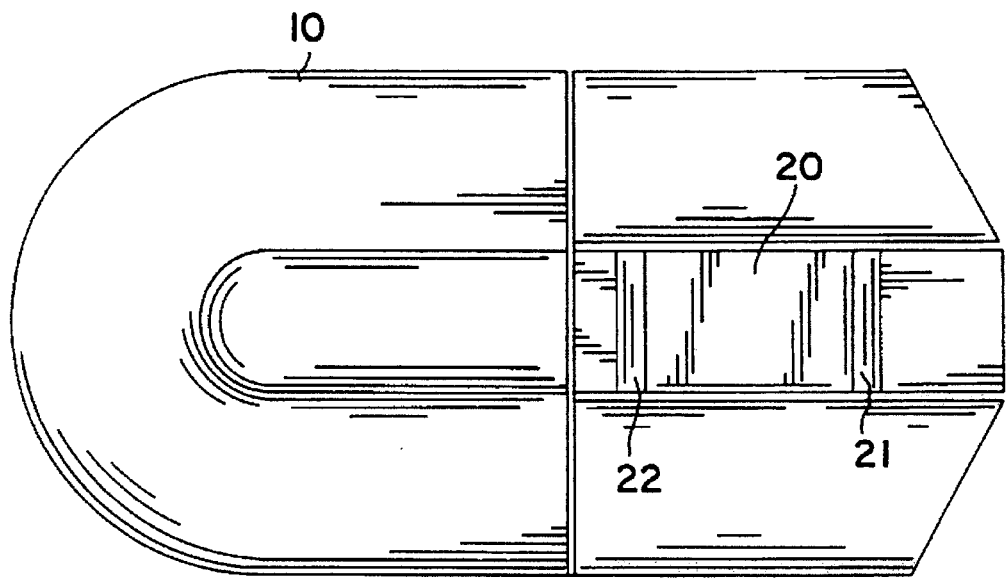
FIG. 1 is a top view of the multidimensional mouse in accordance with the present invention.
Figure 2:
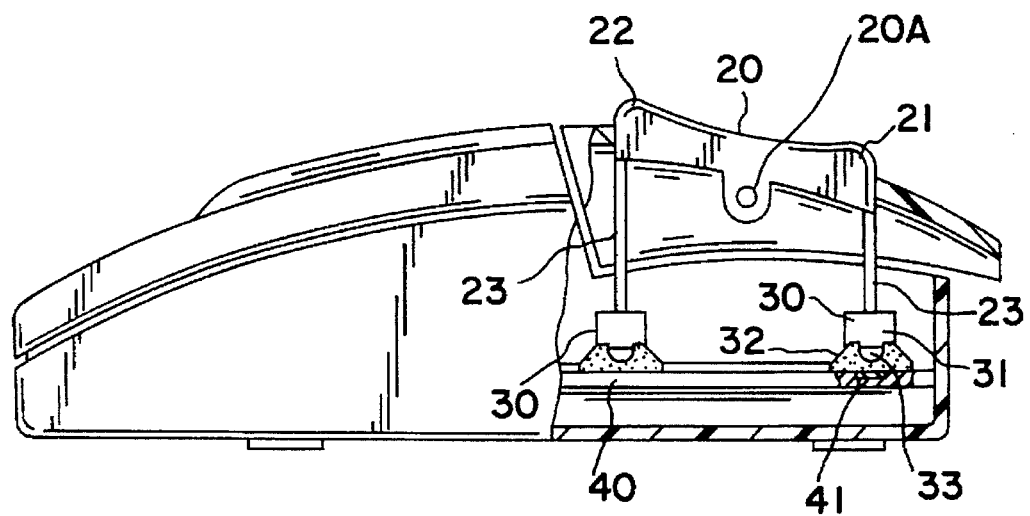
FIG. 2 is a structural diagram of the present invention.

Referring to the drawings and particularly to FIGS. 1 and 2, a multidimensional mouse 10 for use with computers comprises a Z-axis key 20 which is formed with a concave upper surface shape with a front protrusion end 21 and a rear protrusion end 22. The Z-axis key 20 is pivotally connected to the mouse 10 by a pivot 20A and it can be pivotally rotated either by depressing the front protrusion end 21 or by depressing the rear protrusion end 22. Two depression bars 23 are respectively formed under and connected to the front protrusion end 21 and the rear protrusion end 22. Two depression keys 30 are respectively formed under and connected to a corresponding one of the two depression bars 23. A printed circuit board 40 is installed in the mouse 10 and it is under the Z-axis key 20. The printed circuit board 40 includes two contacts 41 (only one is shown in FIG. 2 for simplification) each of which is respectively formed under a corresponding one of the two depression bars 23.

Each of the depression keys 30 comprises a depression portion 31 which is connected to a corresponding one of the depression bars 23, an elastic body 32 which defines a hole (not labeled) substantially through a geometrical center thereof, and a soft conductor 33 which is connected to the depression portion 31 and is slightly enclosed in an upper portion of the hole defined in the elastic body 32. Actually each of the two contacts 41 of the printed circuit board 40 is respectively located in alignment with a corresponding one of the two ends 21 and 22 of the Z-axis key 20, a corresponding one of the two bars 23, and a corresponding one of the two depression keys 30.

The soft conductor 33 is a semi-spherical body which faces to a corresponding contact 41 of the printed circuit board 40 thereunder. The hole defined in the elastic body 32 is a tapering hole and the space thereof allows the soft conductor 33 to freely move therein.

Figure 3:
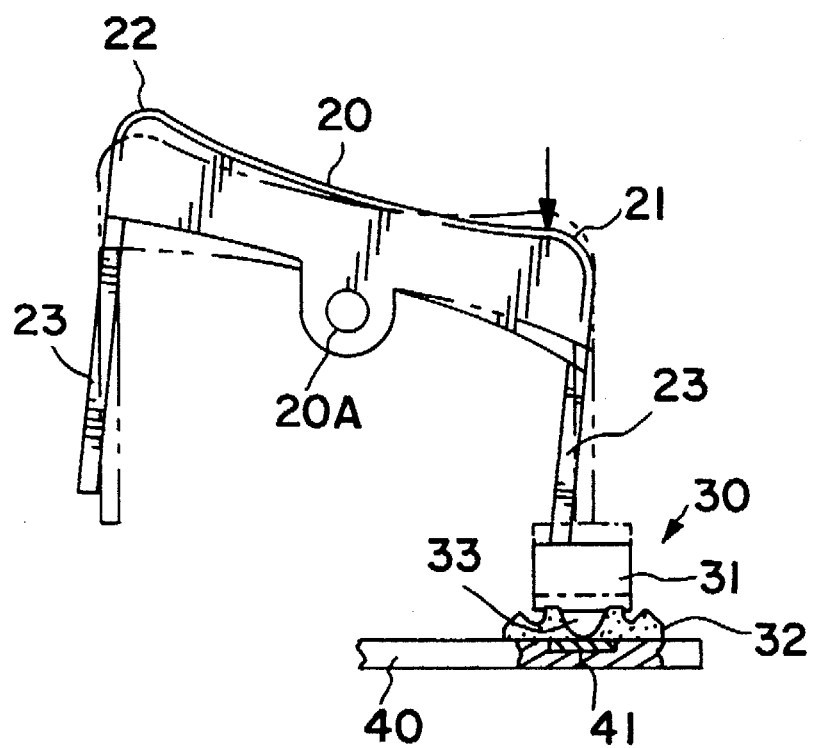
FIG. 3 is an operational view of the present invention, where the phantom lines illustrate the Z-axis key is not depressed, while the solid arrow illustrates that the Z-axis key is manually depressed at the front end thereof.

FIG. 3 illustrates the Z-axis key 20 is manually depressed by a force applied to the front protrusion end 21 thereof. The phantom lines illustrate that the Z-axis key 20 is not depressed, while the solid lines illustrate that the Z-axis key 20 is manually depressed at the front protrusion end 21 thereof. When the front protrusion end 21 is manually depressed by a force indicated by a sold arrow, the front protrusion end 21, the corresponding depression bar 23, the corresponding depression portion 31, and the corresponding soft conductor 33 are simultaneously moved downward, while the corresponding elastic body 32 is deformed allowing the soft conductor 33 to pass through the hole defined therein to be in electrical contact with the corresponding contact 41 of the printed circuit board 40. The soft conductor 33 is kept in electrical contact with the corresponding contact 41 of the printed circuit board 40 when the front protrusion end 21 is kept depressed. Each soft conductor 33 is made of soft conductive material allowing it to be deformed to have a maximum contacting area against the corresponding contact 41 of the printed circuit board 40. The deformed elastic body 32 has a tension to recover the Z-axis key 20 back to its non-depressed position after the depression on the Z-axis key 20 is released. A displacement of a cursor (not shown) along the Z-axis on a computer screen (not shown) is based on the time period during which the front protrusion end 21 (or the rear protrusion end 22) is kept depressed. In this embodiment, a depression on the front protrusion end 21 is assumed to move the cursor on the computer screen in the positive Z-axis direction, while a depression on the rear protrusion end 22 is assumed to move the cursor in the negative Z-axis direction, and vice versa.

Figure 4:
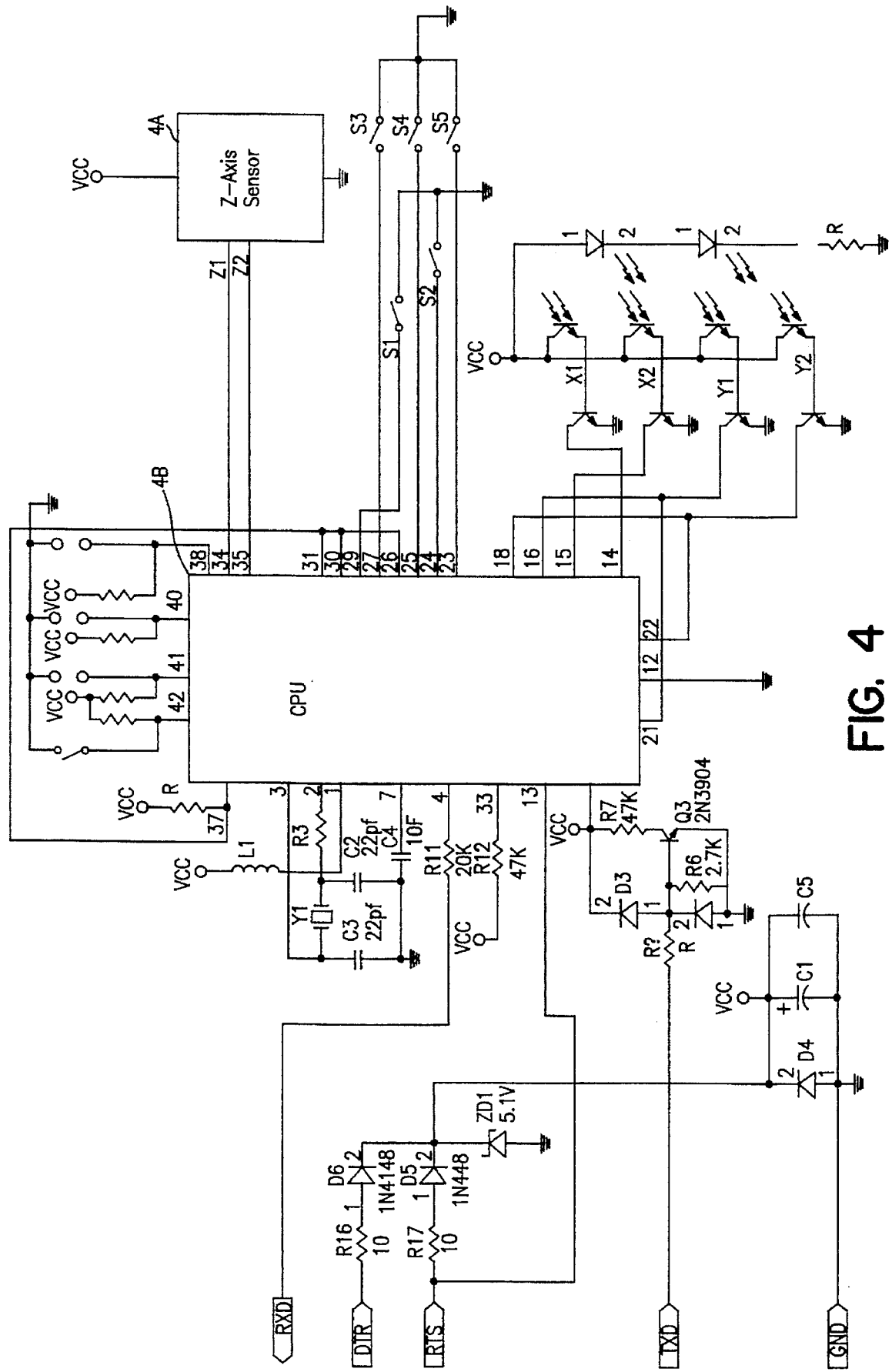
FIG. 4 is a circuit diagram used in the present invention.

The printed circuit board 40 includes a circuit shown in FIG. 4, in which a Z-axis sensor 4A detects the Z-axis direction and displacement entry from the Z-axis key 20, generating a corresponding Z-axis direction and displacement signal to a central processing unit (CPU) 4B, which in turn processes the Z-axis direction and displacement signal and sends out a corresponding processed Z-axis direction and displacement signal to a computer (not shown), therefore a cursor (not shown) shown on a computer screen (not shown) will move based on the processed Z-axis direction and displacement signal.

Figure 5:
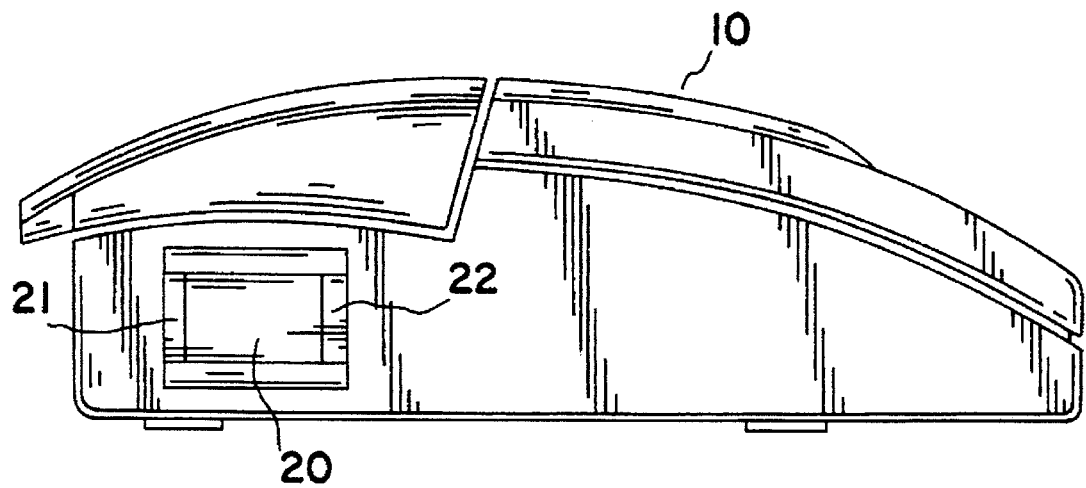
FIG. 5 illustrates a second embodiment of the present invention.
Figure 6:
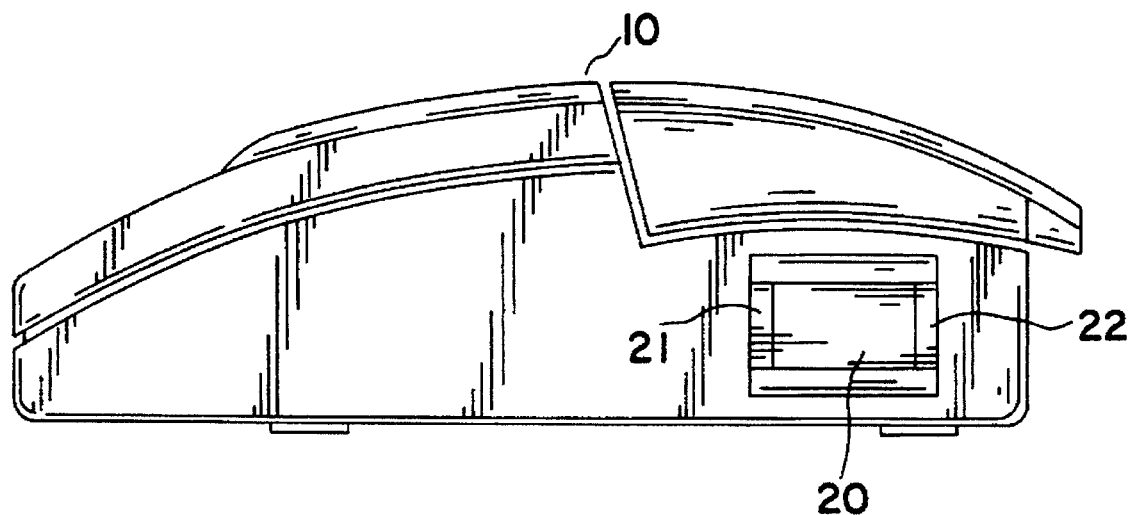
FIG. 6 illustrates a third embodiment of the present invention.
Figure 7:
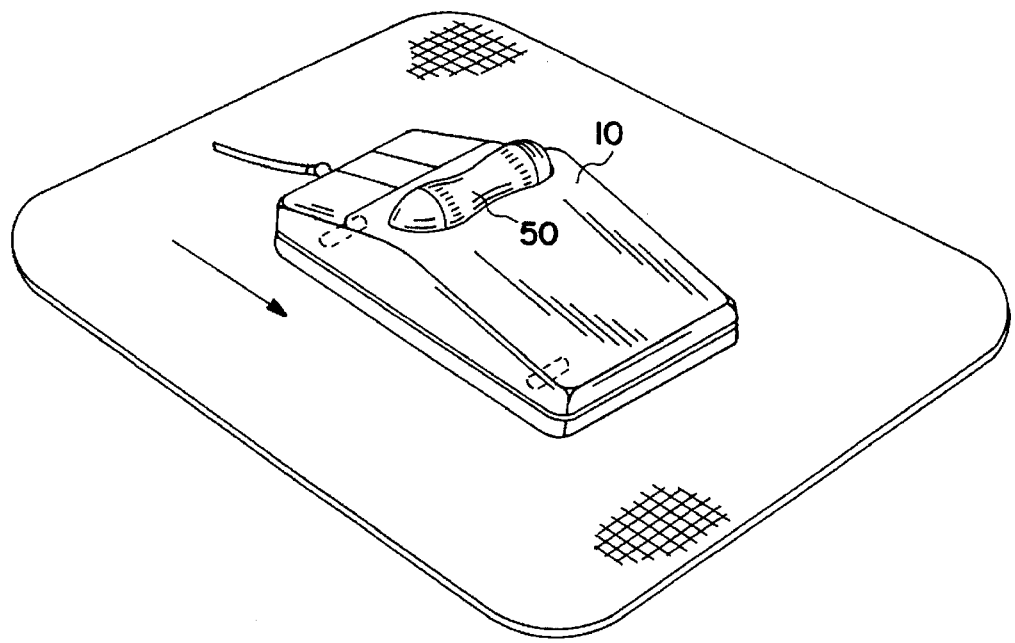
FIG. 7 is a conventional mouse.
Figure 8:
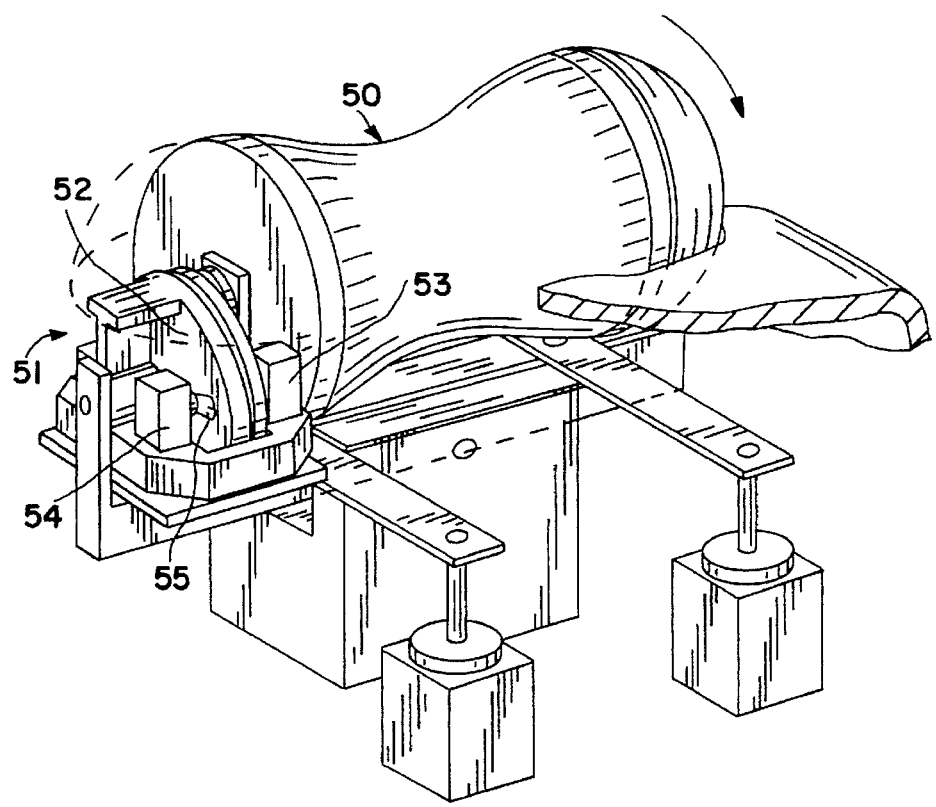
FIG. 8 illustrates the conventional mouse of FIG. 7 in more detail and enlarged.

The first embodiment as described is not particularly dedicated to a left-handed user or a right-handed user because the Z-axis key 20 is installed at the top surface of the mouse 10. FIG. 5 illustrates a second embodiment of the present invention, where the Z-axis key 20 is installed on the left side of the mouse 10 particularly suitable for a left hand user to operate the Z-axis key 20 by his/her left hand thumb. In the second embodiment, the relating parts such as the depression bars 23, the depression key 30, and the printed circuit board 40 are exactly the same as those shown in FIG. 3, except that the viewing position is taken from a top view other than a side view. Similarly, FIG. 6 illustrates a third embodiment of the present invention, where the Z-axis key 20 is installed on the right side of the mouse 10 particularly suitable for a right-handed user to operate the Z-axis key 20 by his/her right hand thumb. In the third embodiment, the relating parts such as the depression bars 23, the depression key 30, and the printed circuit board 40 are exactly the same as those shown in FIG. 3, except that the viewing position is taken from a top view other than a side view.

While the present invention has been explained in relation to its preferred embodiment, it is to be understood that various modifications thereof will by apparent to those skilled in the art upon reading this specification. For example, the elastic body is not limited to the one shown in the first embodiment, and it can be an appropriate elastic load such as a spring. Therefore, it is to be understood that the invention disclosed herein is intended to cover all such modifications as fall within the scope of the appended claims.

I claim:

1. A multidimensional mouse for use with computers, comprising:

a Z-axis key 20 which is pivotally connected to the mouse by a pivot and defines two ends spaced from each other by the pivot;

two depression bars each of which is respectively connected to a corresponding one of the two ends of the Z-axis key;

two depression keys each of which is respectively connected to a corresponding one of the two depression bars;

each of the two depression keys comprising a depression portion which is connected to a corresponding one of the two depression bars, an elastic body which defines a hole substantially through a geometrical center thereof, and a conductor which is connected to the depression portion and enclosed in the hole of the elastic body;

a printed circuit board including two contacts each of which is respectively located in alignment with a corresponding one of the two ends of the Z-axis key, a corresponding one of the two bars, and a corresponding one of the two depression keys;

whereby when one of the two ends of the Z-axis key is manually depressed, the corresponding depression bar, the corresponding depression portion, and the corresponding conductor are simultaneously moved in the depressed direction, while the corresponding elastic body is deformed allowing the corresponding conductor to pass through the hole defined therein to be in electrical contact with the corresponding contact of the printed circuit board; whereby the corresponding conductor is kept in electrical contact with the corresponding contact of the printed circuit board when the end of the Z-axis key is kept depressed; whereby the deformed elastic body has a tension to recover the Z-axis key back to a non-depressed position after the depression on the Z-axis key is released; and whereby a displacement of a cursor along a Z-axis on a computer screen is based on a time period during which the end of the Z-axis key is kept depressed.

2. A multidimensional mouse as claimed in claim 1, wherein the Z-axis key is formed concave at one surface thereof thus the two ends are raised above the surface.

3. A multidimensional mouse as claimed in claim 1, wherein the hole defined in the elastic body is a tapering hole.

4. A multidimensional mouse as claimed in claim 1, wherein each conductor of the two depression keys is a semi-spherical body.

5. A multidimensional mouse as claimed in claim 4, wherein each conductor is made of soft conductive material allowing the conductor to be deformed to have a maximum contacting area against the corresponding contact of the printed circuit board.

6. A multidimensional mouse as claimed in claim 1, wherein each conductor of the depression keys is made of soft conductive material allowing the conductor to be deformed to have a maximum contacting area against the corresponding contact of the printed circuit board.

7. A multidimensional mouse as claimed in claim 1, wherein the Z-axis key is installed on a top surface of the mouse.

8. A multidimensional mouse as claimed in claim 1, wherein the Z-axis key is installed on a left side surface of the mouse.

9. A multidimensional mouse as claimed in claim 1, wherein the Z-axis key is installed on a right side surface of the mouse.

* * * * *